United States Patent
Olivier et al.

(10) Patent No.: US 12,488,467 B2
(45) Date of Patent: Dec. 2, 2025

(54) MULTIPLE-QUALITY ASSESSMENTS FROM SINGLE SEGMENTATION ALGORITHM

(71) Applicant: KONINKLIJKE PHILIPS N.V., Eindhoven (NL)

(72) Inventors: Antoine Olivier, Suresnes (FR); Caroline Denise Francoise Raynaud, Suresnes (FR); Cybele Ciofolo-Veit, Meudon (FR); Laurence Rouet, Paris (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 339 days.

(21) Appl. No.: 18/035,188

(22) PCT Filed: Nov. 3, 2021

(86) PCT No.: PCT/EP2021/080428
§ 371 (c)(1),
(2) Date: May 3, 2023

(87) PCT Pub. No.: WO2022/096471
PCT Pub. Date: May 12, 2022

(65) Prior Publication Data
US 2023/0401719 A1  Dec. 14, 2023

(30) Foreign Application Priority Data
Nov. 9, 2020  (EP) ..................... 20290076

(51) Int. Cl.
G06T 7/11 (2017.01)
G06T 7/00 (2017.01)
G06T 7/60 (2017.01)

(52) U.S. Cl.
CPC .............. G06T 7/11 (2017.01); G06T 7/0012 (2013.01); G06T 7/60 (2013.01);
(Continued)

(58) Field of Classification Search
CPC . G06T 7/0012; G06T 7/11; G06T 7/60; G06T 2207/10132; G06T 2207/30044; G06T 2207/30168
See application file for complete search history.

(56) References Cited

U.S. PATENT DOCUMENTS 5,048,095 A * 9/1991 Bhanu .................... G06V 10/26
382/173
8,942,482 B2 * 1/2015 Joshi .................... G06V 10/993
382/190

(Continued)

FOREIGN PATENT DOCUMENTS

EP   4 080 449 A1 * 10/2022
WO  20180042008 A1   3/2018
(Continued)

OTHER PUBLICATIONS

Luo, Hong, et al. "Automatic quality assessment for 2D fetal sonographic standard plane based on multi-task learning." arXiv preprint arXiv:1912.05260 (Year: 2019).*
(Continued)

*Primary Examiner* — Scott A Rogers

(57) ABSTRACT

A method of analyzing an ultrasound image involves assessing the quality of the image in terms of which features of interest have been identified in the image and assessing a
(Continued)

segmentation quality relating to the quality of a segmentation of the image. The two quality assessments are combined to derive and output an overall quality assessment for biometry measurements obtained from the image.

14 Claims, 3 Drawing Sheets

(52) U.S. Cl.
CPC ............... *G06T 2207/10132* (2013.01); *G06T 2207/30044* (2013.01); *G06T 2207/30168* (2013.01)

(56) References Cited

U.S. PATENT DOCUMENTS

| | | | | |
|---|---|---|---|---|
| 10,169,681 | B2* | 1/2019 | Tahmasebi Maraghoosh | G06F 18/2185 |
| 10,751,029 | B2* | 8/2020 | Abolmaesumi | A61B 8/0883 |
| 11,069,059 | B2* | 7/2021 | Rouet | A61B 8/5223 |
| 11,803,970 | B2* | 10/2023 | Yamamura | G06T 7/0012 |
| 11,850,038 | B2* | 12/2023 | Canfield | A61B 5/107 |
| 12,205,293 | B2* | 1/2025 | Gilbert | G06T 7/11 |
| 2017/0178320 | A1 | 6/2017 | Saalbach et al. | |
| 2018/0150598 | A1 | 5/2018 | Kohls et al. | |
| 2021/0177374 | A1* | 6/2021 | Balicki | G16H 10/20 |
| 2023/0306590 | A1* | 9/2023 | Jazdzyk | G16H 30/40 |
| 2024/0320833 | A1* | 9/2024 | Han | G06T 7/0002 |
| 2024/0350109 | A1* | 10/2024 | Sevenster | G16H 30/40 |

FOREIGN PATENT DOCUMENTS

| | | |
|---|---|---|
| WO | 2020020809 A1 | 1/2020 |
| WO | 2020038781 A1 | 2/2020 |

OTHER PUBLICATIONS

Noble, J. Alison, and Djamal Boukerroui. "Ultrasound image segmentation: a survey." IEEE Transactions on medical imaging 25.8, pp. 987-1010 (Year: 2006).*

Saini, Kalpana, M. L. Dewal, and Manojkumar Rohit. "Ultrasound imaging and image segmentation in the area of ultrasound: a review." International Journal of advanced science and technology 24 (Year: 2010).*

Song, Yuxin, et al. "Medical ultrasound image quality assessment for autonomous robotic screening." IEEE Robotics and Automation Letters 7.3, pp. 6290-6296 (Year: 2022).*

Wang, Zhaobin, E. Wang, and Ying Zhu. "Image segmentation evaluation: a survey of methods." Artificial Intelligence Review 53.8, pp. 5637-5674 (Year: 2020).*

Xiao, Xiaolong, et al. "Deep learning-based medical ultrasound image and video segmentation methods: Overview, frontiers, and challenges." Sensors 25.8, p. 2361 (Year: 2025).*

Meng, Qingjie, et al. "Weakly supervised estimation of shadow confidence maps in fetal ultrasound imaging." IEEE transactions on medical imaging 38.12, pp. 2755-2767. (Year: 2019).*

Udupa, Jayaram K., et al. "A framework for evaluating image segmentation algorithms." Computerized medical imaging and graphics 30.2, pp. 75-87 (Year: 2006).*

Zaini, Syed Zakwan Syed, et al. "Image quality assessment for image segmentation algorithms: Qualitative and quantitative analyses." 2019 9th IEEE international conference on control system, computing and engineering (ICCSCE). IEEE (Year: 2019).*

International Search Report and Written Opinion for PCT/EP2021/080428; Mailing date: Feb. 9, 2022, 11 pages.

Lin, Z. et al., "Multi-task learning for quality assessment of fetal head ultrasound images", Med Image Anal., 2019, vol. 58, 101548, 14 pages.

Lin, Z. et al., "Quality Assessment of Fetal Ultrasound Images Based on Faster R-CNN", POCUS BIVPCS CuRIOUS CPM, 2018, Lecture Notes in Computer Science, 2018, vol. 11042, pp. 38-46.

DeVries, T. et al., "Leveraging Uncertainty Estimates for Predicting Segmentation Quality", arXiv:1807.00502v1, 2018, 9 pages.

Rahmatullah, B. et al., "Quality control of fetal ultrasound images: Detection of abdomen anatomical landmarks using AdaBoost", IEEE International Symposium on Biomedical Imaging: From Nano to Macro, 2011, pp. 6-9.

Gao, Y. et al., "Label Efficient Localization of Fetal Brain Biometry Planes in Ultrasound Through Metric Learning", ASMUS/PIPPI 2020, Lecture Notes in Computer Science, 2020, 12437, pp. 126-135.

Anonymous, "ISUOG Practice Guidelines: ultrasound assessment of fetal biometry and growth", Ultrasound Obstet Gynecol., 2019, vol. 53, pp. 715-723.

* cited by examiner

MULTIPLE-QUALITY ASSESSMENTS FROM SINGLE SEGMENTATION ALGORITHM

CROSS-REFERENCE TO PRIOR APPLICATIONS

This application is the U.S. National Phase application under 35 U.S.C. § 371 of International Application No. PCT/EP2021/080428, filed on Nov. 3, 2021, which claims the benefit of European Patent Application No. 20290076.7, filed on Nov. 9, 2020. These applications are hereby incorporated by reference herein.

FIELD OF THE INVENTION

This invention relates to the field of ultrasound imaging, for example it relates to the field of fetal ultrasound imaging.

BACKGROUND OF THE INVENTION

It is common clinical practice to perform automatic measurement of features from ultrasound images, for example captured by a fetal ultrasound scan. The measurement typically involves segmentation of the images to identify features of interest, using a segmentation algorithm, and then performing biometry measurements. Examples of fetal measurements are for example the abdominal circumference and the nuchal translucency.

Deep learning based algorithms are very efficient at solving such segmentation and biometry measurement tasks.

The biometry measurements to be performed often require strict image acquisition guidelines to be followed. Some anatomical structures must be visible in the acquired image, and their dimensions or proportions may be specified by the same guidelines.

In current clinical practice, a user or software selects a frame that is deemed suitable for biometry measurements, before applying segmentation and biometry measurements. Thus, the frame selection and biometry measurements are independent tasks.

This results in an inefficient process for making biometry measurements.

SUMMARY OF THE INVENTION

The invention is defined by the claims.

According to examples in accordance with an aspect of the invention, there is provided a method of analyzing an ultrasound image, comprising:
receiving an ultrasound image of an imaging region having features of interest;
performing segmentation on the ultrasound image to identify the features of interest;
performing a biometry measurement of the features of interest present in the image;
generating a segmentation quality assessment relating to the quality of the segmentation;
generating an image content quality assessment for the image relating at least to which features of interest have been identified in the image;
combining the segmentation quality assessment and the image content quality assessment to derive an overall quality assessment for the biometry measurements; and
outputting the overall quality assessment.

This method performs segmentation to identify features of interest in an ultrasound image. The quality of the segmentation is assessed using known methods. This may for example create a quality score, or confidence level, or confidence map for the segmentation. In addition, an image content quality assessment is made. This involves determining how well the image meets acquisition guidelines. It is based on an assessment of at least the presence of a particular set of anatomical features of interest, but optionally other parameters such as sizes, orientations etc., of those features. The image content quality assessment is not independent of the segmentation and indeed it relies on the segmentation to assess the image content. The overall quality assessment indicates whether or not (or to what extent) the biometry measurements may be relied upon. Thus, a user is provided with a simple indication of the quality of the biometry measurements, taking into account whether or not the image meets standardized image acquisition requirements.

The image content quality assessment relates to the suitability of the content of the image to be used to perform the particular biometry measurement being conducted. The segmentation quality assessment may be applied to individual pixels of the image, and optionally an overall segmentation quality score may be generated for the image as a whole.

The method may comprise outputting the image content quality assessment and optionally also information relating to the reasons for a low image content quality assessment.

By outputting the image content quality assessment as well as the overall quality assessment, the user is aware if the reason for a low overall quality is the image content. The reasons for a low image content quality assessment are for example that certain features of interest could not be identified in the image.

Generating an image content quality assessment may comprise identifying the presence of features of interest, and one or more of:
identifying the alignment between features of interest;
identifying a size of one or more features of interest;
identifying a size ratio between features of interest;
identifying an orientation of one or more features of interest;
identifying a shape of one or more features of interest;
identifying a proportion of the image occupied by one or more features of interest.

These characteristics of the features of interest determine if the image is suitable for making the biometry measurements. They are obtained using the segmentation algorithm.

The overall assessment may comprise a confidence level in the biometry measurement.

Deriving a segmentation quality assessment may comprise generating a confidence map. The image may then be displayed with the confidence map overlaid over the image.

This enables a user to visually identify where the image segmentation may not be relied upon so they can also make a judgement of the reliance that can be placed on the biometry measurement.

The method is for example for analyzing fetal ultrasound images.

Fetal imaging has strict image acquisition guidelines to be followed which define images that are suitable for particular biometry measurements.

The features of interest, specifically for a fetal abdominal scan, then preferably comprise one or more of:
the spine;
the umbilical vein;
the stomach;
the heart;
the kidneys;
the abdominal section.

Of course, other features will be of interest for other types of scan.

In fetal biometry, measurements of interest may comprise the circumference, biparietal diameter and/or occipitofrontal diameter of either the head or of the abdomen, depending on the anatomy of the ultrasound image (whether the image is of the head or the abdomen). The abdominal circumference is typically used in combination with the head circumference and femur length to determine the weight and age of a fetus. These measurements may for example allow the cephalic index and/or the ratio between the femur length and abdominal circumference to be determined, as these are well known measurements which may indicate the health of a fetus.

In one particular example, the biometry measurement comprises a nuchal translucency measurement and in another example the biometry measurement additionally or alternatively comprises an abdominal circumference measurement.

In all possible uses of the method, performing the segmentation, generating the segmentation quality assessment and generating the image content quality assessment may be performed using deep learning, such as using a deep neural network (DNN), for example one or several stochastic deep neural networks.

Deep learning is able to perform segmentation and image content analysis in a rapid and reliable way.

The invention also provides a computer program comprising computer program code means which is adapted, when said computer program is run on a computer, to implement the method define above. A processor is also provided for analyzing a fetal ultrasound image comprising a memory which stores the computer program.

The invention also provides an ultrasound imaging system comprising:
  an ultrasound probe adapted to acquire ultrasound images of an imaging region;
  a display; and
  the processor defined above.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
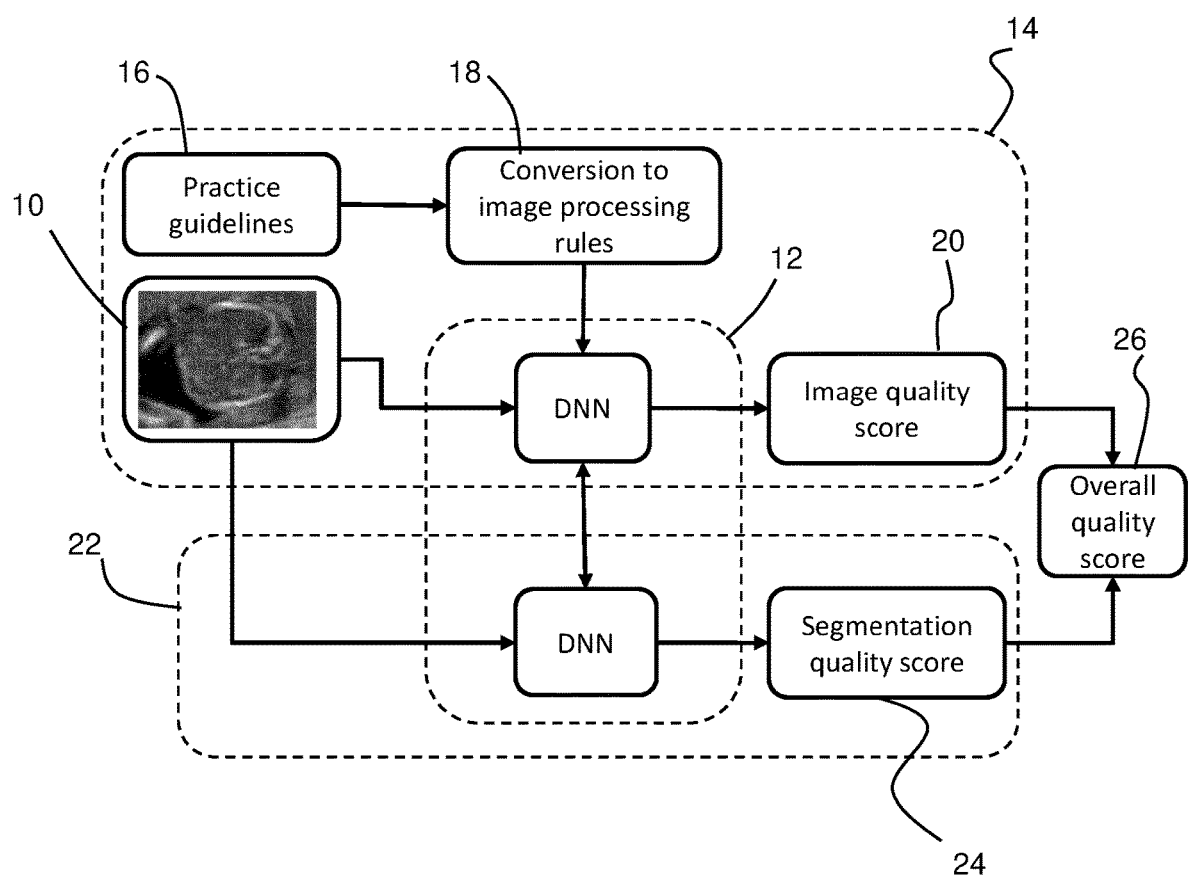
FIG. 1 shows the method steps performed a processor for analyzing an image.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method of analyzing an ultrasound image which involves assessing the quality of the image in terms at least of which features of interest have been identified in the image, and assessing a segmentation quality relating to the quality of a segmentation of the image. The two quality assessments are combined to derive and output an overall quality assessment for biometry measurements obtained from the image. This enables a user to be informed of the reliability of the biometry measurements.

FIG. 1 shows the various functional units involved in the method. The various functions are all performed by a processor of an ultrasound imaging system, The purpose of the method is to make biometry measurements, and also to indicate a reliability of those measurements.

An ultrasound image 10 is received of an imaging region, having features of interest. For fetal imaging, the features of interest for example comprise one or more of:
  the spine;
  the umbilical vein;
  the stomach;
  the heart;
  the kidneys;
  the abdominal section.

The ultrasound image is provided to an image processing algorithm 12. This performs image segmentation to identify and measure the features of interest. The image processing algorithm then also performs biometry measurements based on the image segmentation.

The image processing algorithm is involved in two quality assessment processes. A first process 14 involves determining a quality of the image content. This quality relates to the suitability of the image for use in making the particular biometry measurements which are to be performed.

For this purpose, practice guidelines 16 are used. Biometry measurements in fetal ultrasound often require strict image acquisition guidelines to be followed. Some anatomical structures must be visible in the acquired image, and their dimensions or proportions may be specified by the same guidelines. These conditions are stipulated by the practice guidelines 16.

The guidelines are converted into image processing rules in step 18. The image processing rules thus for example stipulate which features of interest are required in the image, and the quality of the image content depends on the features that have been identified.

An image content quality assessment for the image is determined in step 20. This may be considered to be an "image quality score".

Performing the image content quality assessment comprises identifying the presence of features of interest as mentioned above, and it preferably includes one or more of the additional steps of:
  identifying the alignment between features of interest;
  identifying a size of one or more features of interest;
  identifying a size ratio between features of interest;
  identifying an orientation of one or more features of interest;
  identifying a shape of one or more features of interest;
  identifying a proportion of the image occupied by one or more features of interest.

These characteristics of the features of interest determine if the image is suitable for making the biometry measurements. They are obtained based on the segmentation.

By way of example, some image based guidelines, and the way the guidelines are implemented using image processing, are explained below.

For the presence of structures, the image processing involves detection and classification.

For determining the alignment between structures, the image processing performs localization and pose estimation.

For determining sizes and size ratios, the image processing involves segmentation and identification of regions of interest.

For determining orientation, the image processing involves localization, segmentation and pose estimation.

Additional metadata may also be used, for example provided by the user or derived from other images, relating to one or more of a subject (patient) age interval, a subject size interval and a subject weight interval.

The manner in which some specific guidelines may be converted into image processing rules will now be presented, relating to the particular example of fetal imaging.

A first example is a nuchal translucency (NT) measurement.

The guidelines for example specify that:
(i) NT should be measured at between 11 weeks and 13 weeks+6 days, corresponding to Crown Rump Length (CRL) between 45 and 84 mm.

The image processing involves a CRL measurement on the corresponding image. This could be achieved with pose estimation models, or segmentation techniques. (ii) The Fetus should be in a neutral position (no hyperextended of flexed neck).

The image processing is used to assess that there is no curvature at the back of the skull and spine region, by segmenting the sonoluscent space. Then, the border of this sonoluscent space should have curvature below a tolerance threshold.

(iii) The sagittal view of the median view of the fetal face is characterized by the presence of the echogenic tip of the nose, rectangular shape of the palate, translucent diencephalon in the center and the nuchal membrane posteriorly.

These requirements can be assessed using object detection architectures such as the "you only look once" object detection (YOLO) or object detection based on regions with convolutional neural networks (RCNN).

(iv) The image should be magnified to have a full-screen head and thorax (>75% of the image).

This can be achieved using head and thorax segmentation (e.g. using U-Net)

A second example an abdominal circumference (AC) measurement.

The guidelines for example specify that:
(i) The presence of the stomach, small size umbilical vein aligned with the spine, no kidney and no heart.

The presence and absence of anatomies can be detected by object detection (YOLO, RCNN).

(ii) The abdominal section should be as circular as possible.

This can be determined by abdominal segmentation processing (U-Net).

The output to the user may indicate how the guidelines have or have not been met. For example, the image may be annotated to show the presence of the required features and to highlight features that are missing or conditions that are not met.

Figure 2:
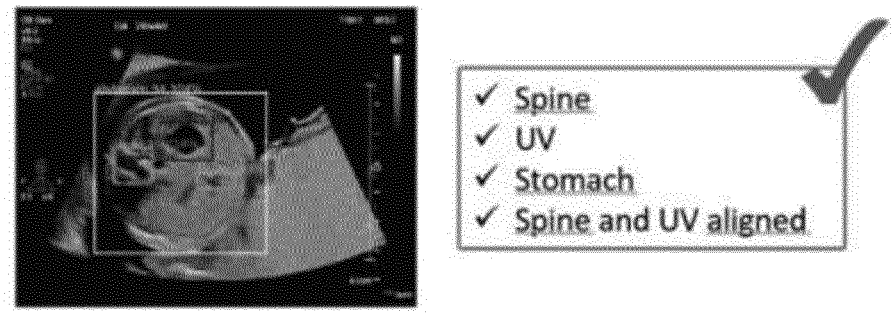
FIG. 2 shows how an image is assessed to determine if it meets guidelines.
Figure 2:
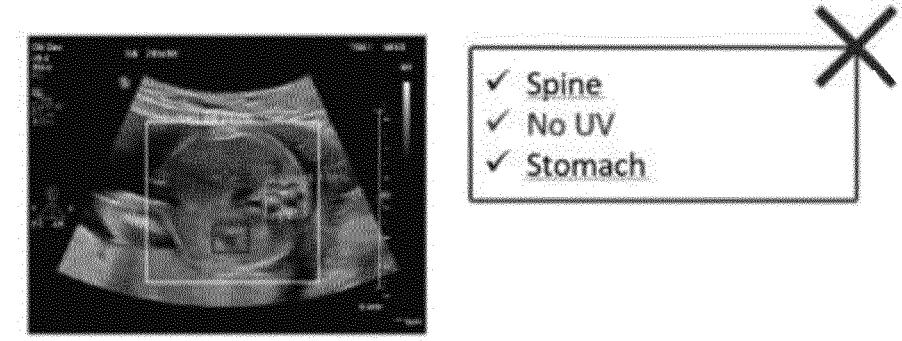

FIG. 2 shows in the top part an image which meets the requirements for an AC measurement—the spine, umbilical vein and stomach are present, with the spine and UV aligned.

FIG. 2 shows in the bottom part an image which does not meet the requirements for an AC measurement—the UV is not present and hence alignment with the spine is not confirmed.

A second process 22 involves generating a segmentation quality assessment in step 24, relating to the quality of the segmentation. This may be considered to be a "segmentation quality score". The segmentation quality assessment may be applied to individual pixels of the image, and optionally an overall segmentation quality score may be generated for the image as a whole.

The same image processing algorithm 12 is used for both the image content quality assessment and the segmentation quality assessment, so they are not independent.

The segmentation quality assessment for example involves building a confidence (or certainty/uncertainty) score and/or a confidence map In order to build a confidence score, the method of DeVries, T., & Taylor, G. W. (2018), "Leveraging Uncertainty Estimates for Predicting Segmentation Quality" (arXiv:18707.00502) may be used. This approach uses Monte Carlo dropout (MC-dropout) during testing, whereas it is usually used while training a network. MC-dropout consists in randomly removing a portion of the connections from one layer to another. During training, using MC-dropout reduces the risk of overfitting the model on the training data, as it incorporates some stochastic behavior in the network's prediction. However, MC-dropout is usually removed during testing, because the user wants a deterministic prediction, and it is better to leverage all connections available in the network.

Using MC-dropout during testing will thus build a stochastic model. By inferring N times with the same model using MC-dropout, a model can be obtained with a stochastic behavior, which enables the generation of a confidence map.

The average prediction for each pixel is:

$$f(x) = \frac{1}{N}\sum_{n=1}^{N} \text{Softmax}(\rho_n(x)) \text{ with} \quad (1)$$

$\rho_n(x)$ the prediction at pixel x for network $n$.

If the segmentation model has C classes (example: stomach, heart, umbilical vein), the uncertainty for each pixel is:

$$z(x) = -f_c(x)\sum_{c=1}^{C} \log f_c(x) \quad (2)$$

If only one class is segmented, equation (2) is written with two classes: foreground and background.

$$z(x)=-f(x)\log(f(x))-(1-f(x))\log(1-f(x)) \quad (3)$$

$M=\int 1_{f(x)>0.5}dx$ is the segmentation area
$ME=\int z(x)dx$ is the average entropy score
$C=M/ME$ is the confidence score Further details can be found in the reference above.

Note that this is only one possible method for building a confidence score from the neural network output. Ensemble methods and probabilistic segmentation networks may also be used.

Figure 3:
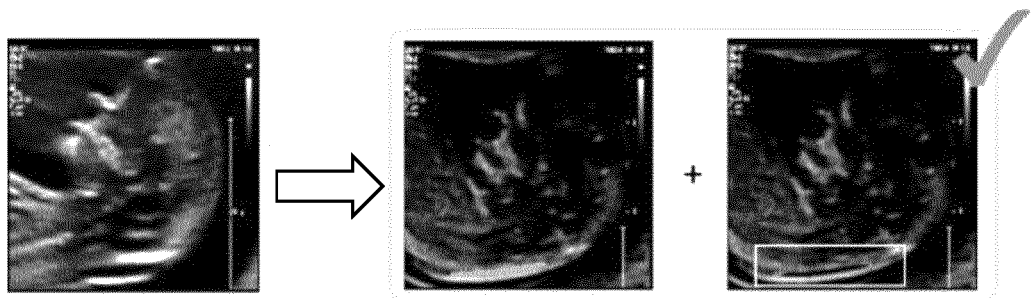
FIG. 3 shows how an image is assessed to show the segmentation quality.
Figure 3:
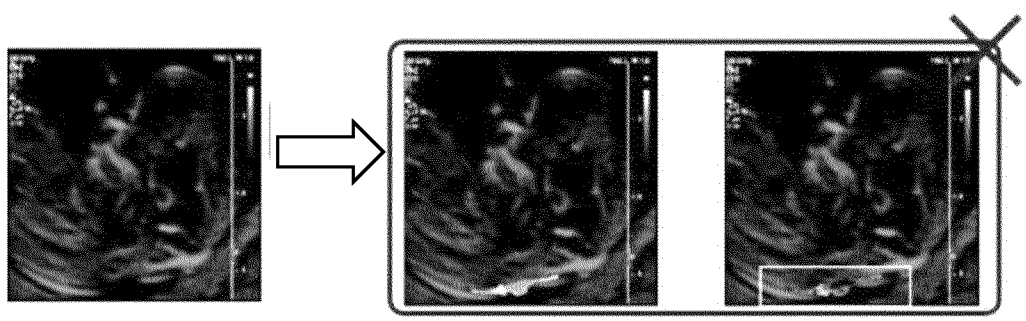

The results of the segmentation quality assessment are illustrated in FIG. 3 for nuchal translucency segmentation.

The left images show the original image, the middle images show the sonoluscent space segmentation and the right images show the confidence map, in which uncertain regions are highlighted. The confidence map information is overlaid over the image.

The top set of images show a low number of highlighted pixels on the confidence map hence a high confidence score, and the DNN is confident in the quality of a biometric prediction.

The bottom set of images show a high number of highlighted pixels on the confidence map hence a low confidence score, and the DNN is not confident in the quality of a biometric prediction. The user is warned and asked to perform a manual review. The user may also be given a numeric or graphical confidence score.

The bottom images have an uncertainty map with a larger region with high uncertainty than the top images.

Some guidelines are formulated based not only on the presence of features of interest, but also on constraints on the shape of the structures visible in the frame of interest, such as a circular section of the abdomen, a neutral position of the fetus neck (not flexed or hyperextended). Therefore, the confidence map related to the corresponding segmentation may also be used to assess the adherence of the shape to the guidelines. For instance, if the abdomen is segmented as a circular shape, but with low confidence score, the associated score reflecting the adherence to the guidelines is correspondingly degraded.

Returning to FIG. 1, the segmentation quality assessment and the image content quality assessment are combined to derive an overall quality assessment for the biometry measurements in step 26. The overall quality assessment is the output. Furthermore, the image content quality assessment (the image quality score) and optionally also information relating to the reasons for a low image content quality assessment may be output.

By outputting the image content quality assessment as well as (or as part of) an overall quality assessment, the user is aware of the reason for a low overall quality in the image content. The reasons for a low image content quality assessment are for example that certain features of interest could not be identified in the image. In this way, the user is presented with two pieces of information. The frame quality assessment (or score) indicates how well the current frame follows standard guidelines, and the details can be provided to the user concerning which parts of the guidelines are not respected. The overall quality assessment is an estimation of what level of confidence can be placed in the biometry measurement that is output by the system.

Two images may be output, one comprising the information about the image quality (such as in FIG. 2) and one showing the confidence map (such as in FIG. 3). These two images when combined may together be considered to constitute the overall quality assessment. However, there is preferably an additional separate a numeric or textual description of the overall assessment of the confidence in the biometry measurement.

In summary, the processor of the invention implements a method by which segmentation is used to identify features of interest in an ultrasound image. The quality of the segmentation is assessed using known methods. This may for example create a quality score, or confidence level, or confidence map for the segmentation. In addition, an image content quality assessment is made. This involves determining how well the image meets acquisition guidelines. It is based on an assessment of at least the presence of a particular set of anatomical features of interest, but optionally other parameters such as sizes, orientations etc., of those features. The overall assessment may comprise a confidence level in the biometry measurement.

The image processing algorithm for example comprises a deep learning algorithm, such as a stochastic deep neural network. The approach is thus based on two observations related to automatic measurement, for example in fetal ultrasound. Deep learning based algorithms are very efficient at solving segmentation tasks (on which many measurements rely) but the result may be difficult to interpret. The invention firstly provides an index that scores a confidence in the segmentation output. The method however also ensures that the measurement output (based on a segmentation of the input frame) have a high enough confidence. The overall quality score thus provides a combination of the segmentation result confidence (segmentation quality confidence score) as well as the confidence in matching the practice guidelines (image quality score).

Both scores are however correlated as they are derived from the same segmentation algorithm as mentioned above. Indeed, in most cases, in order to check that an image fits the guidelines, the same structures will have to be segmented both for the biometry measurement and for verifying the adherence to the guidelines.

Figure 4:
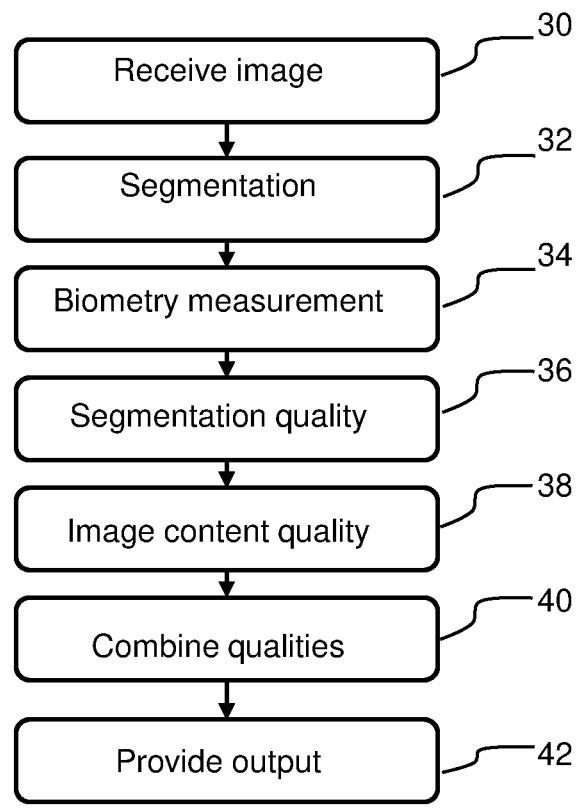
FIG. 4 shows a method of analyzing an image.

FIG. 4 shows the method performed by the processor. The method comprises:

In step 30, receiving an ultrasound image of an imaging region having features of interest;

In step 32, performing segmentation on the ultrasound image to identify the features of interest;

In step 34, performing a biometry measurement of the features of interest present in the image;

In step 36, generating a segmentation quality assessment relating to the quality of the segmentation;

In step 38, generating an image content quality assessment for the image relating at least to which features of interest have been identified in the image;

In step 40, combining the segmentation quality assessment and the image content quality assessment to derive an overall quality assessment for the biometry measurements; and In step 42, outputting the overall quality assessment.

Figure 5:
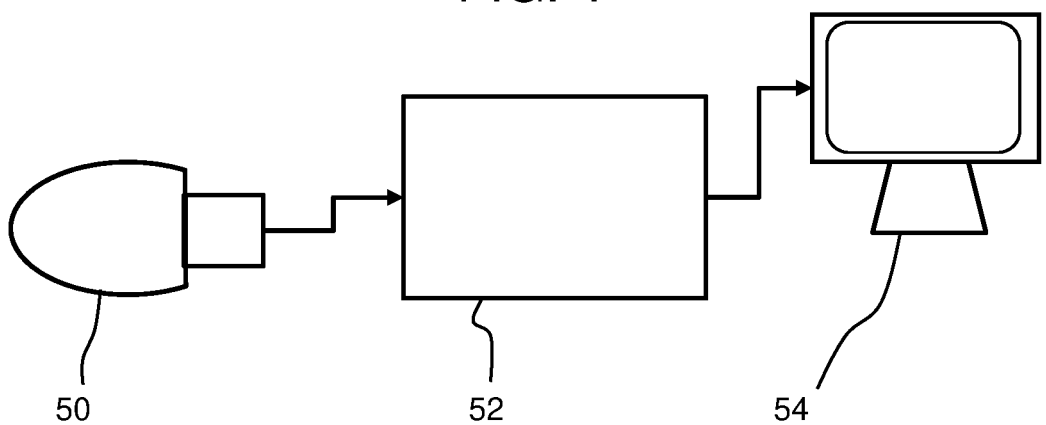
FIG. 5 shows an ultrasound system.

FIG. 5 shows an ultrasound system comprising a probe 50 adapted to acquire ultrasound images of an imaging region, a display 54 and the processor 52 programmed to perform the functionality explained above.

As discussed above, the system makes use of processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of analyzing an ultrasound image, comprising:
    receiving an ultrasound image of an imaging region having features of interest;
    performing segmentation on the ultrasound image to identify the features of interest;
    performing a biometry measurement of the features of interest present in the image;
    generating a segmentation quality assessment relating to the quality of the segmentation;
    generating an image content quality assessment for the image relating at least to which features of interest have been identified in the image;
    combining the segmentation quality assessment and the image content quality assessment derive an overall quality assessment for the biometry measurements, wherein the segmentation quality assessment and the image content quality assessment are derived from a single segmentation algorithm; and
    outputting the overall quality assessment.

2. The method of claim 1, comprising outputting the image content quality assessment and optionally also information relating to the reasons for a low image content quality assessment.

3. The method of claim 1, wherein generating an image content quality assessment comprises identifying the presence of features of interest, and one or more of:
    identifying the alignment between features of interest;
    identifying a size of one or more features of interest;
    identifying a size ratio between features of interest;
    identifying an orientation of one or more features of interest;
    identifying a shape of one or more features of interest;
    identifying a proportion of the image occupied by one or more features of interest.

4. The method of claim 1, wherein the overall assessment comprises a confidence level in the biometry measurement.

5. The method of claim 1, wherein deriving a segmentation quality assessment comprises generating a confidence map.

6. The method of claim 5, wherein the method comprises displaying the image with the confidence map overlaid over the image.

7. The method of claim 1, for analyzing fetal ultrasound images.

8. The method of claim 7, wherein the features of interest comprise one or more of:
    the spine;
    the umbilical vein;
    the stomach;
    the heart;
    the kidneys;
    the abdominal section.

9. The method of claim 7, wherein the biometry measurement comprises a nuchal translucency measurement.

10. The method of claim 7, wherein the biometry measurement comprises an abdominal circumference measurement.

11. The method of claim 1, wherein performing the segmentation, generating the segmentation quality assessment and generating the image content quality assessment are performed using deep learning.

12. The method of claim 11, wherein performing the segmentation, generating the segmentation quality assessment and generating the image content quality assessment are performed by a single stochastic deep learning neural network.

13. A non-transitory computer readable medium comprising computer code that in response to execution on a processor cause the processor to implement the method of claim 1.

14. An ultrasound imaging system comprising:
    an ultrasound probe to acquire ultrasound images of an imaging region;
    a display; and
    the processor of claim 1.

* * * * *